United States Patent [19]

Niven et al.

[11] 4,243,900
[45] Jan. 6, 1981

[54] MULTIPLE STAGE MINIATURE STEPPING MOTOR

[75] Inventors: William A. Niven, Livermore; S. David Shikany, Danville; Michael L. Shira, Fremont, all of Calif.

[73] Assignee: The United States of America as represented by the United States Department of Energy, Washington, D.C.

[21] Appl. No.: 957,621

[22] Filed: Nov. 3, 1978

[51] Int. Cl.³ .......................................... H02K 37/00
[52] U.S. Cl. .................................. 310/49 R; 310/254; 310/269; 310/40 MM
[58] Field of Search ...................... 310/49 R, 269, 163, 310/164, 166, 168, 254, 40 MM

[56] References Cited

U.S. PATENT DOCUMENTS

| | | | |
|---|---|---|---|
| 2,454,519 | 11/1948 | McNaney | 310/49 R |
| 3,327,191 | 6/1967 | Goto | 310/49 R X |
| 3,355,646 | 11/1967 | Goto | 310/49 R |
| 3,806,744 | 4/1974 | Abraham | 310/49 R |
| 3,809,989 | 5/1974 | Hays | 310/49 R X |
| 3,950,663 | 4/1976 | Mead | 310/49 R |
| 4,127,802 | 11/1978 | Johnson | 310/49 R X |

FOREIGN PATENT DOCUMENTS 1436199  5/1976  United Kingdom ................. 310/49 R

OTHER PUBLICATIONS

*IBM Technical Disclosure Bulletin*-Variable Speed Reluctance Stepping Motor by R. H. Darling, vol. 13, No. 8, Jan. 1971, pp. 2466.

Primary Examiner—Mark O. Budd
Attorney, Agent, or Firm—James E. Denny; Roger S. Gaither; L. E. Carnahan

[57] ABSTRACT

A stepping motor comprising a plurality of stages which may be selectively activated to effect stepping movement of the motor, and which are mounted along a common rotor shaft to achieve considerable reduction in motor size and minimum diameter, whereby sequential activation of the stages results in successive rotor steps with direction being determined by the particular activating sequence followed.

4 Claims, 11 Drawing Figures

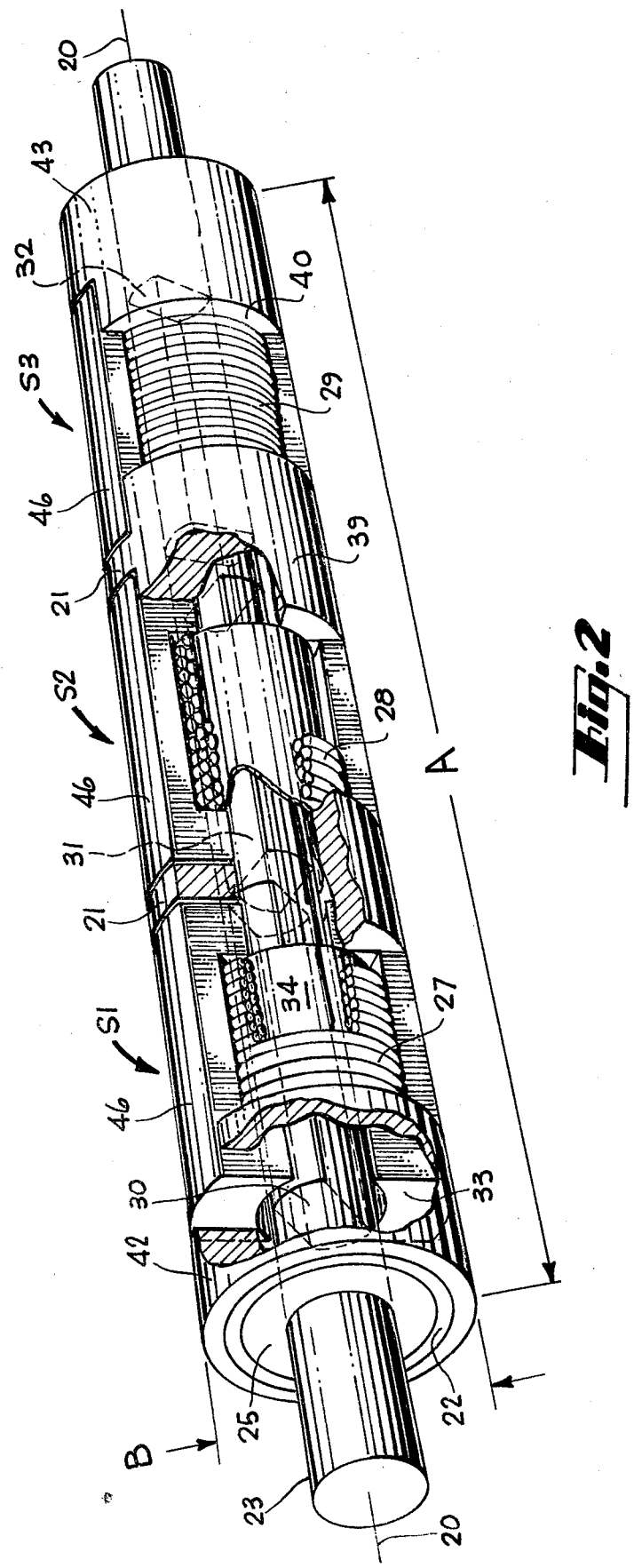

MULTIPLE STAGE MINIATURE STEPPING MOTOR

BACKGROUND OF THE INVENTION

The invention described herein was made at the Lawrence Livermore Laboratory in the course of, or under, Contract No. W-7405-ENG-48, between the University of California and the United States Department of Energy.

The invention relates to stepping motors, and more particularly to a stepping motor which may be selectively controlled and which may be constructed of very small size and minimum diameter.

Stepping motors are known in the art. However, due to the size of the prior known stepping motors, a need has existed for a miniature stepping motor of minimum diameter which can be selectively controlled whereby partial or full rotation of the output shaft can be readily accomplished.

SUMMARY OF THE INVENTION

The present invention satisfied the above mentioned need by providing a minimum diameter, miniature stepping motor comprising a plurality of stages mounted along a common shaft, the various stages being selectively activated to effect stepping movement. In addition the direction of shaft rotation is determined by the particular sequence followed in activating the stages. The number of activations applied to the motor stages determines the number of shaft revolutions. Also, sequential activation of the stages results, for example, in successive rotor steps of 60°.

Therefore, it is an object of this invention to provide a miniature stepping motor of minimum diameter.

A further object of the invention is to provide a stepping motor utilizing a plurality of selectively activated stages mounted along a common rotor shaft.

Another object of the invention is to provide a miniature stepping motor utilizing a plurality of selectively controlled stages along a common shaft such that the direction of rotation is determined by the particular sequence followed in activating the stages.

Another object of the invention is to provide a miniature stepping motor utilizing selectively activated stages such that sequential activation of the stages results in successive rotor steps of about 60°.

Other objects of the invention will become readily apparent to one skilled in the art from the following description and accompanying drawings.

BRIEF DESCRIPTION OF THE DRAWINGS

FIG. 2 is an enlarged view, partially in cross-section, of a preferred embodiment of the invention;

DESCRIPTION OF THE INVENTION

The invention involves a multiple-stage stepping motor which may be selectively controlled, and which may be constructed of very small size by a novel arrangement of components. Sequential activation of the stages thus results in successive rotor steps of 60 degrees. The direction of rotor shaft rotation is determined by the particular sequence followed in activating the stages. The number of activations applied to the motor determines the number of rotor shaft revolutions.

Figure 1:
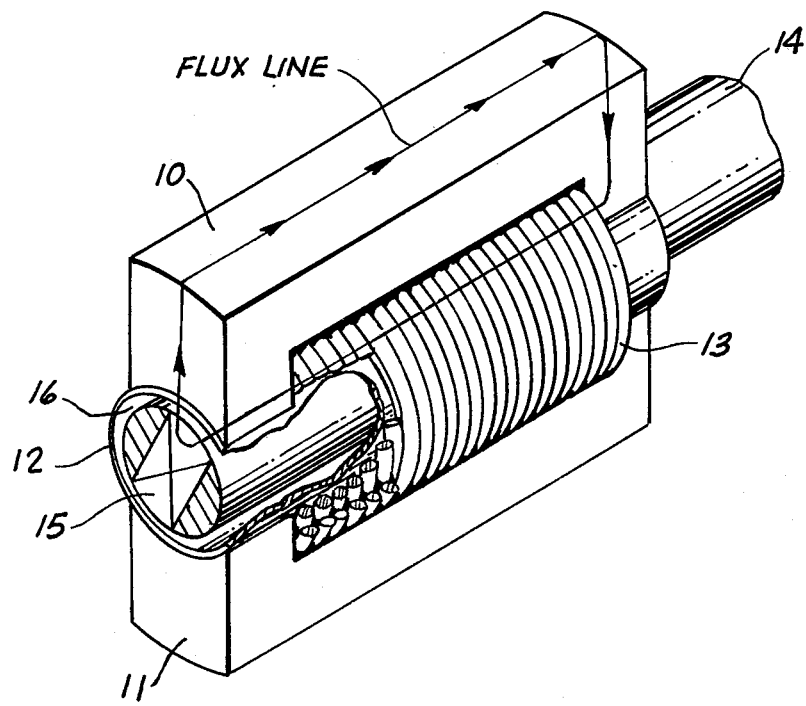
FIG. 1 is an enlarged partial cut-away view of an embodiment of a single stage device incorporating the invention and illustrating the principle of operation thereof.

Referring now to the drawings, FIG. 1 illustrates a single stage embodiment in accordance with the invention and shows the principle of operation thereof. This embodiment comprises a pair of soft iron pole pieces 10 and 11 mounted on an annular stator tube or coil bobbing 12 of nonmagnetic material (e.g. aluminum or plastic); a coil 13 is wound on stator or bobbin 12 between the two pole pieces 10 and 11; and a rotor shaft 14 is coaxially disposed within the annular stator tube 12, supported therein via bearings (not shown), and constructed of a nonmagnetic material (e.g. aluminum or plastic) with a rectangular magnetic insert 15 constructed of soft iron or Vanadium Permendur (50% Co, 2% V, remainder Fe), for example, which extends along the length of the pole pieces 10 and 11.

When a voltage, from a source not shown, is applied to the coil 13, the resulting current generates a magnetic field parallel to the rotor shaft 14. The magnetic flux, indicated by the legend flux line, travels through the insert 15, crosses an air gap 16 between the rotor and the pole pieces, travels through the pole pieces 10 and 11 (only shown through 10), and crosses the air gap 16 again to complete a loop. In response to the generated magnetic field, the stage tends to align itself to produce the least reluctance flux path, thus magnetic insert 15 tends to align with the flow direction of the flux line, indicated by arrows. Thus, a force is exerted on the rotor insert 15 which tends to reduce the air gap 16 to a minimum, i.e., to produce the shortest flux path. This force causes the rotor insert 15 to align itself parallel to the pole pieces, resulting in rotation of the rotor shaft 14.

Figure 3:
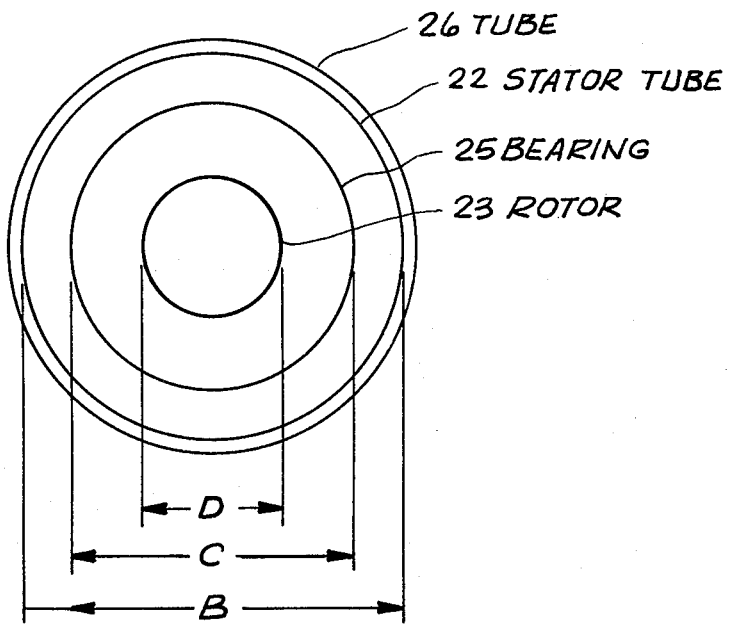
FIG. 3 is an end view of the FIG. 2 embodiment.
Figure 4:
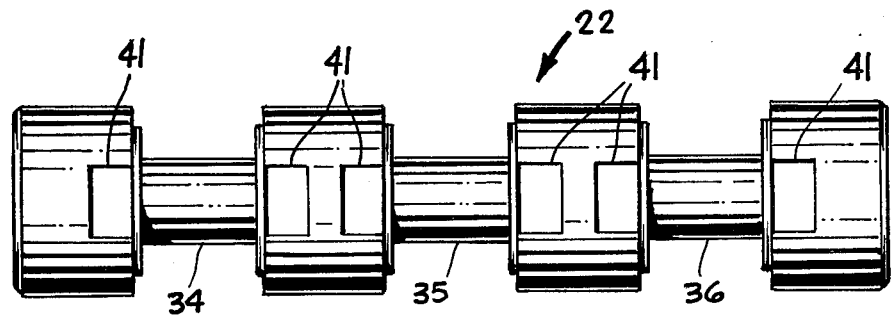
FIGS. 4 and 5 illustrate top and side views of stator of the FIG. 2 embodiment.
Figure 5:
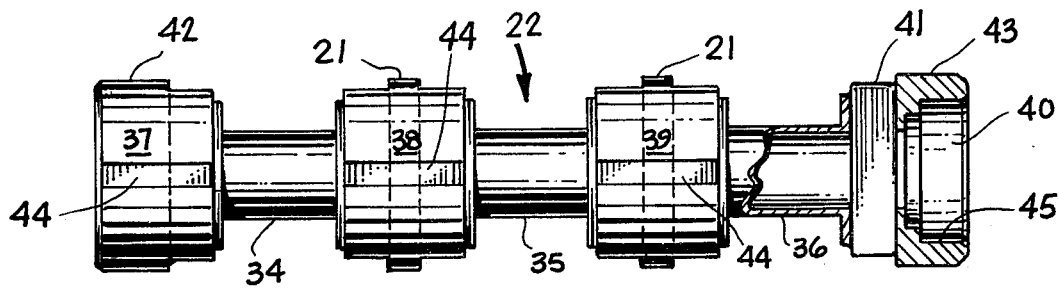
Figure 6:
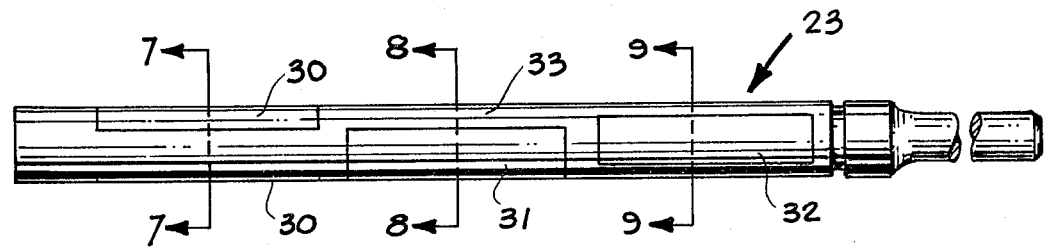
FIG. 6 is a view of the rotor of the FIG. 2 embodiment.
Figure 7:
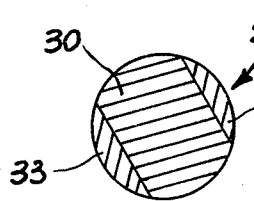
FIGS. 7, 8 and 9, are cross-sectional views taken along the lines 7—7, 8—8, and 9—9 of FIG. 6.
Figure 8:
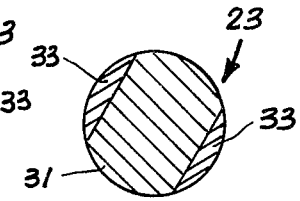
Figure 9:
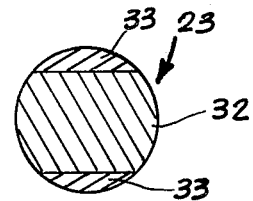
Figure 10:
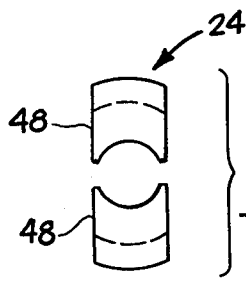
FIGS. 10 and 11 are end and side views of a pole piece of the FIG. 2 embodiment.
Figure 11:
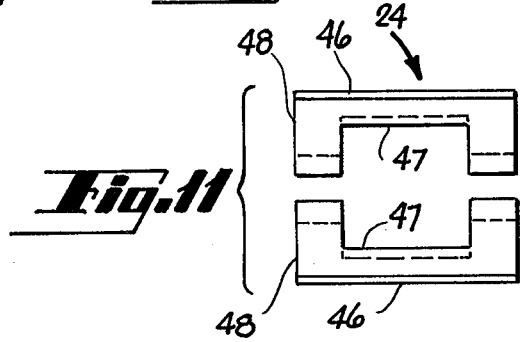

FIGS. 2–11 illustrates a preferred embodiment of the invention wherein the miniature stepping motor comprises, for simplicity of description, three stages $S_1$, $S_2$, and $S_3$ arranged along a common axis 20. It is understood that multiple stages $S_1$ to $S_N$ may be utilized depending on the various applications, and illustration of only three (3) stages is not intended to limit the preferred embodiment. To break the magnetic path between adjacent stages, spacers 21 of a nonmagnetic material (e.g., aluminum or plastic) are positioned between the stages, between stages $S_1$ and $S_2$ and between $S_2$ and $S_3$ in the illustrated embodiment. The illustrated embodiment basically comprises an annular stator tube or coil bobbin assembly shown in FIGS. 4 and 5, generally indicated at 22 and which include spacers 21, a rotor shaft assembly shown in FIGS. 6–9 generally indicated at 23 and adapted to be attached to an associated mechanism to be driven or controlled, and a pole piece assembly shown in FIGS. 10 and 11 (three utilized), generally indicated at 24. As seen in FIGS. 2 and 3, the rotor shaft assembly 23 is supported within the stator tube assembly 22 by bearing assemblies 25 (only 1 shown) which may be constructed of stainless steel, for example, and in press fit with the rotor and stator tube. Rotor assembly 23 consists of nonmagnetic rotor body 33 and three rectangular magnetic inserts 30, 31 and 32. The inserts are positioned at 120° to each other as illustrated in FIGS. 7, 8, and 9. A thin-wall tube 26 (see FIG. 3) of aluminum, for example, encompasses each of the stages S$_1$, S$_2$, and S$_3$. Coils 27, 28 and 29 of electrically conductive material are wrapped around respective bobbins 34, 35, and 36 of the stator tube assembly 22. Each stage is provided with a set of current leads (not shown) electrically connected to coils 27–29 and to a power source and control (not shown), which allows selective and sequential activation of the various stages to effect the stepping movement of the motor. The stator tube assembly 22, as seen in FIGS. 4 and 5, consists of three flanged tubes or bobbins 34, 35 and 36 mounted intermediate four pole piece supports 37, 38, 39 and 40. Each of the pole piece supports 37–40 has slots 41 therein within which pole piece assemblies 24 are positioned, with spacers 21 being located on supports 38 and 39, (see FIG. 5), and with supports 37 and 40 having portions 42 and 43, respectively, of the same outside diameter as spacers 21. Supports 37–40 are each provided with a longitudinally extending groove 44 which provides passage for the current leads. Supports 37 and 40 are also provided with countersinks 45 in which bearings 25 fit. As seen in FIGS. 10 and 11, pole piece assemblies 24 consist of a pair of soft iron pole pieces or members 46 having a body section 47 and a pair of extending leg sections 48 which fit into slots 41 of associated supports 37–40 when positioned about stator tube assembly 22.

By way of example, the three stage embodiment as illustrated in FIGS. 2 and 3 has a length A of 1.16 inches (29.5 mm), an outer stator tube diameter B of 0.25 inches (6.4 mm), an outer bearing diameter C of 0.1874 inches (4.76 mm), and a rotor diameter D of 0.094 inches (2.39 mm). The rotor inserts 30–32 are 0.066 inches wide and 0.293 inches long, coils 27–29 being constructed of 300 turns of 0.0036 inches (No. 40) diameter insulated copper wire, the pole pieces 46 having a width of 0.099 inches, and the spacers 21 having a thickness of 0.038 inches. The thin-wall tube 26 has a wall thickness of 0.01 inches (0.25 mm). With a stepping motor of the above size, each of the stages (S$_1$, S$_2$, and S$_3$) apply a torque of 0.035 oz-in to the rotor shaft 23, for example, and requires a current of about 0.5 amps to activate each stage. All of the stages S$_1$–S$_3$ of the stepping motor are identical except for the relative positions of the inserts 30–32 in rotor shaft 23. In the three-stage embodiment of FIG. 2, the rotor inserts 30–32 are spaced 120° apart. Sequential activation of the stages thus results in successive rotor steps of 60°, in this embodiment. The direction of rotor shaft rotation is determined by the particular sequence followed in activating the stages. The number of activations applied to the motor determines the number of rotor shaft revolutions (thus, one complete revolution for every six activations of the three-stage motor shown in FIG. 2).

It has thus been shown that the present invention provides a stepping motor which may be selectively controlled, and which may be constructed of very small size and diameter with a novel arrangement of component parts, thus advancing the state of this art.

While a particular embodiment of the invention has been illustrated and described, modifications will become apparent to those skilled in the art, and it is intended to cover in the appended claims all such modifications as come within the spirit and scope of the invention.

What we claim is:

1. A miniature stepping motor composed of a plurality of selectively controlled stages arranged longitudinally along a common centrally located rotor shaft and having nonmagnetic spacer means positioned intermediate each of said plurality of stages, such that sequential activation of the stages results in successive rotor steps of about 60° to provide partial or full rotation of said rotor shaft; each of said stages consisting of an annular bobbin constructed of nonmagnetic material positioned in spaced relationship about said rotor shaft, a pair of longitudinally extending soft iron pole pieces mounted on opposite sides of said annular bobbin, each of said pole pieces having an inner cutaway section, a coil of electrically conductive material wound on said bobbin at said cut-away sections of said pole pieces, and an insert of magnetic material positioned in and exposed on opposite sides of said rotor shaft and extending along the longitudinal length of said pole pieces; said nonmagnetic spacer means being constructed to retain said pair of pole pieces of each adjacent stage on opposite sides of said bobbin of each adjacent stage; said inserts of magnetic material in said plurality of stages being located in said common rotor shaft at an angle with respect to said pole pieces and with respect to one another.

2. The stepping motor defined in claim 1, wherein said plurality of stages comprises three stages, and wherein said insert of magnetic material in each of said stages is located 120° with respect to each other.

3. The stepping motor defined in claim 2, wherein said three stages have a length of about 1.16 inch and a width of about 0.25 inch.

4. The stepping motor defined in claim 1, wherein said insert of magnetic material in each of said stages is of a rectangular configuration.

* * * * *